United States Patent
Chinoy et al.

(10) Patent No.: US 11,851,279 B1
(45) Date of Patent: Dec. 26, 2023

(54) DETERMINING TRENDS FROM MATERIALS HANDLING FACILITY INFORMATION

(71) Applicant: Amazon Technologies, Inc., Seattle, WA (US)

(72) Inventors: Ammar Chinoy, Seattle, WA (US); Sudarshan Narasimha Raghavan, Snoqualmie, WA (US); Emilio Ian Maldonado, Seattle, WA (US); Daniel Bibireata, Bellevue, WA (US); Nishitkumar Ashokkumar Desai, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 344 days.

(21) Appl. No.: 14/501,794

(22) Filed: Sep. 30, 2014

(51) Int. Cl.
*B65G 37/00* (2006.01)
*G06N 7/04* (2006.01)
*B65G 1/16* (2006.01)
*G06N 5/04* (2023.01)

(52) U.S. Cl.
CPC ............... *B65G 1/16* (2013.01); *G06N 5/04* (2013.01)

(58) Field of Classification Search
CPC combination set(s) only.
See application file for complete search history.

(56) References Cited

U.S. PATENT DOCUMENTS

| | | |
|---|---|---|
| 7,225,980 B2 | 6/2007 | Ku et al. |
| 7,949,568 B2 | 5/2011 | Fano et al. |
| 8,009,864 B2 | 8/2011 | Linaker et al. |
| 8,175,925 B1 | 5/2012 | Rouaix |
| 8,189,855 B2 | 5/2012 | Opalach et al. |
| 8,219,438 B1 * | 7/2012 | Moon ............... G06Q 30/0201 |
| | | 705/7.29 |
| 8,423,431 B1 | 4/2013 | Rouaix et al. |
| 8,630,924 B2 | 1/2014 | Groenevelt et al. |
| 8,688,598 B1 | 4/2014 | Shakes et al. |
| 9,473,747 B2 | 10/2016 | Kobres et al. |
| 2003/0002712 A1 | 1/2003 | Steenburgh et al. |
| 2003/0216969 A1 * | 11/2003 | Bauer ................... G06K 17/00 |
| | | 705/22 |
| 2004/0181467 A1 | 9/2004 | Raiyani et al. |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Luna Champagne
(74) *Attorney, Agent, or Firm* — Athorus, PLLC

(57) ABSTRACT

Described is a system and method for collecting item and user information and utilizing that information to determine materials handling facility patterns, item trends and inventory location trends. User monitoring data for users located in a materials handling facility may include information identifying inventory locations approached by users, gaze directions of users, user dwell times, an identification of items picked by users, an identification of items placed by users, and/or in-transit times for items. This information may be aggregated and processed to determine materials handling facility patterns, item trends and/or inventory location trends.

24 Claims, 10 Drawing Sheets

(56) References Cited

U.S. PATENT DOCUMENTS

| | | | |
|---|---|---|---|
| 2007/0016494 A1* | 1/2007 | Brown | G06Q 30/02 |
| | | | 705/28 |
| 2008/0055087 A1 | 3/2008 | Horii et al. | |
| 2008/0065468 A1* | 3/2008 | Berg | G06Q 30/02 |
| | | | 705/7.32 |
| 2008/0077511 A1 | 3/2008 | Zimmerman | |
| 2008/0109114 A1 | 5/2008 | Orita et al. | |
| 2009/0121017 A1 | 5/2009 | Cato et al. | |
| 2009/0245573 A1 | 10/2009 | Saptharishi et al. | |
| 2011/0011936 A1 | 1/2011 | Morandi et al. | |
| 2012/0284132 A1 | 11/2012 | Kim et al. | |
| 2013/0054310 A1* | 2/2013 | Sickenius | G06Q 30/02 |
| | | | 705/7.39 |
| 2013/0076898 A1 | 3/2013 | Philippe et al. | |
| 2013/0253700 A1 | 9/2013 | Carson et al. | |
| 2014/0279294 A1 | 9/2014 | Field-Darragh et al. | |
| 2015/0019391 A1 | 1/2015 | Kumar et al. | |
| 2015/0073907 A1* | 3/2015 | Purves | G06Q 20/32 |
| | | | 705/14.58 |
| 2016/0203499 A1* | 7/2016 | Yamashita | G06V 20/52 |
| | | | 705/7.29 |

OTHER PUBLICATIONS

Cristian Pop, "Introduction to the BodyCom Technology", Microchip AN1391, May 2, 2011, pp. 1-26, vol. AN1391, No. DS01391A, Publisher: 2011 Microchip Technology Inc.

* cited by examiner

| INVENTORY LOCATION TRENDS | | | |
|---|---|---|---|
| DWELL TIME | GAZE TIME | PICK VOLUME | TREND |
| - | - | - | No Change |
| - | - | ↑ | Up |
| - | - | ↓ | Down |
| - | ↑ | - | Up |
| - | ↑ | ↑ | Up |
| - | ↑ | ↓ | Desired Item Not At Inventory Location |
| - | ↓ | - | No Change |
| - | ↓ | ↑ | Up |
| - | ↓ | ↓ | Desired Item Not At Inventory Location |
| ↑ | - | - | No Change |
| ↑ | - | ↑ | Up |
| ↑ | - | ↓ | Desired Item Not At Inventory Location |
| ↑ | ↑ | - | Up |
| ↑ | ↑ | ↑ | Up |
| ↑ | ↑ | ↓ | Desired Item Not At Inventory Location |
| ↑ | ↓ | - | No Change |
| ↑ | ↓ | ↑ | Up |
| ↑ | ↓ | ↓ | Desired Item Not At Inventory Location |
| ↓ | - | - | No Change |
| ↓ | - | ↑ | Up |
| ↓ | - | ↓ | Down |
| ↓ | ↑ | - | No Change |
| ↓ | ↑ | ↑ | Up |
| ↓ | ↑ | ↓ | Desired Item Not At Inventory Location |
| ↓ | ↓ | - | No Change |
| ↓ | ↓ | ↑ | Up |
| ↓ | ↓ | ↓ | Down |

FIG. 8B

DETERMINING TRENDS FROM MATERIALS HANDLING FACILITY INFORMATION

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 8B is a diagram illustrating inventory location trends, according to an implementation.

Figure 1:
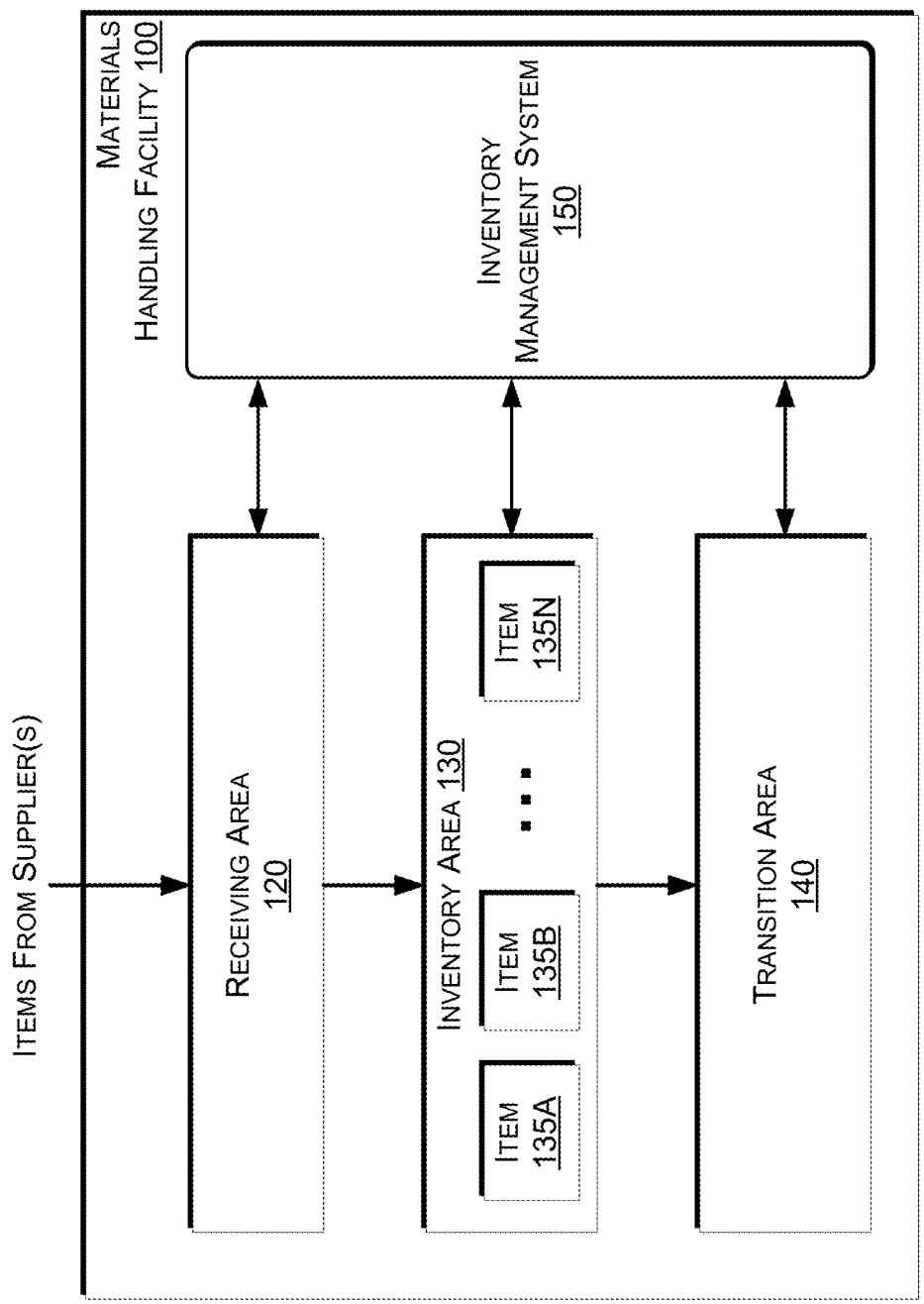
FIG. 1 is a block diagram illustrating a materials handling facility, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Described is a system and method for collecting item and user information and utilizing that information to determine materials handling facility patterns, item trends and inventory location trends. As discussed herein, a user may be monitored as they progress through a materials handling facility. The monitoring may include monitoring the movement of the user through the materials handling facility, inventory locations approached by the user, a gaze direction of the user, user dwell times, determining items picked by the user, determining items placed by the user (either into a tote or back on the inventory location) and/or in-transit times for items, which represents the time an item is in-transit from an item pick to an item place.

As discussed herein, an "item pick" is any selection and retrieval of an item from a location. For example, an item pick from an inventory location occurs when a user picks or otherwise removes an item from the inventory location. Likewise, an item pick from a tote (described below) occurs when a user picks or otherwise removes an item from a tote. An item pick may also be performed at other locations (e.g., an item may be picked from a drop location, transportation unit).

An "item place" is any placement of an item. For example, an item place to inventory location occurs when an item (e.g., a picked item) is placed at the inventory location. Likewise, an item place to tote occurs when a user places an item into a tote. An item place may also be performed at other locations (e.g., drop locations).

An item is considered "in-transit" when it is between an item pick and an item place and item in-transit time may be determined for items that are in-transit and represent the time duration between the item pick and the item place. For example, a user may pick an item from an inventory location to look at the item before they place it back at the inventory location or into a tote. The time duration between the item pick and the item place is the item in-transit time.

Utilizing collected user movement data, materials handling facility patterns, item trends and/or inventory location trends may be determined, according to implementations discussed herein. For example, during a selected time period, high traffic areas, congestion areas, high concentration areas, movement patterns, etc., may be determined for a materials handling facility. Likewise, based on average item gaze time changes, item pick volume changes, average item in-transit time changes and item place volume changes, item trends such as predicted inventory turnover, may be determined for items within the materials handling facility. Turnover, as used herein, represents the number of times inventory (items) is sold, rented, leased, given, used, etc., during a time duration (e.g., day, week, month, year). Utilizing the implementations discussed herein, trends, such as item turnover, can be predicted with greater accuracy.

Similarly, based on average inventory location gaze time changes, inventory location item pick volume changes for the inventory location, average inventory location item in-transit time changes for items at the inventory location, and inventory location item place volume changes for items at the inventory location, inventory location trends may be determined for inventory locations within the materials handling facility.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

An implementation of a materials handling facility configured to store and manage inventory items is illustrated in FIG. 1. As shown, a materials handling facility 100 includes a receiving area 120, an inventory area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, inventory areas 130 and transition areas 140 may be interspersed rather than segregated. Additionally, the materials handling facility 100 includes an inventory management system 150 configured to interact with each of receiving area 120, inventory area 130, transition area 140 and/or users within the materials handling facility 100.

The materials handling facility 100 may be configured to receive different kinds of inventory items 135 from various suppliers and to store them until a user orders or retrieves one or more of the items. The general flow of items through materials handling facility 100 is indicated using arrows. Specifically, as illustrated in this example, items 135 may be received from one or more suppliers, such as manufacturers, distributors, wholesalers, etc., at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, weight, package date, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135, such as bulk products, commodities, etc., may be stored in continuous or arbitrarily divisible amounts that may not be inherently organized into countable units. Such items 135 may be managed in terms of measurable quantities, such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within inventory area 130 on an inventory shelf at an inventory location. In some implementations, like items 135 may be stored or displayed together in bins, on shelves or via other suitable storage mechanisms, such that all items 135 of a given kind are stored in one inventory location. In other implementations, like items 135 may be stored in different inventory locations. For example, to optimize retrieval of certain items 135 having high turnover or velocity within a large physical facility, those items 135 may be stored in several different inventory locations to reduce congestion that might occur at a single point of storage.

When a user order specifying one or more items 135 is received, or as a user progresses through the materials handling facility 100, the corresponding items 135 may be selected or picked from inventory area 130, referred to herein as an item pick. For example, in one implementation, a user may have a list of items to pick and may progress through the materials handling facility performing item picks of the items identified on the list of items to pick. In other implementations, materials handling facility employees (referred to herein as users) may pick items 135 using written or electronic pick lists derived from orders. In some instances, an item may need to be repositioned from one inventory location within the inventory area 130 to another inventory location. For example, in some instances, an item may be picked from its inventory location, moved a distance and placed at another inventory location. Likewise, when an inventory item 135 is added to inventory, a user may be instructed to place the item at an inventory location.

Figure 2:
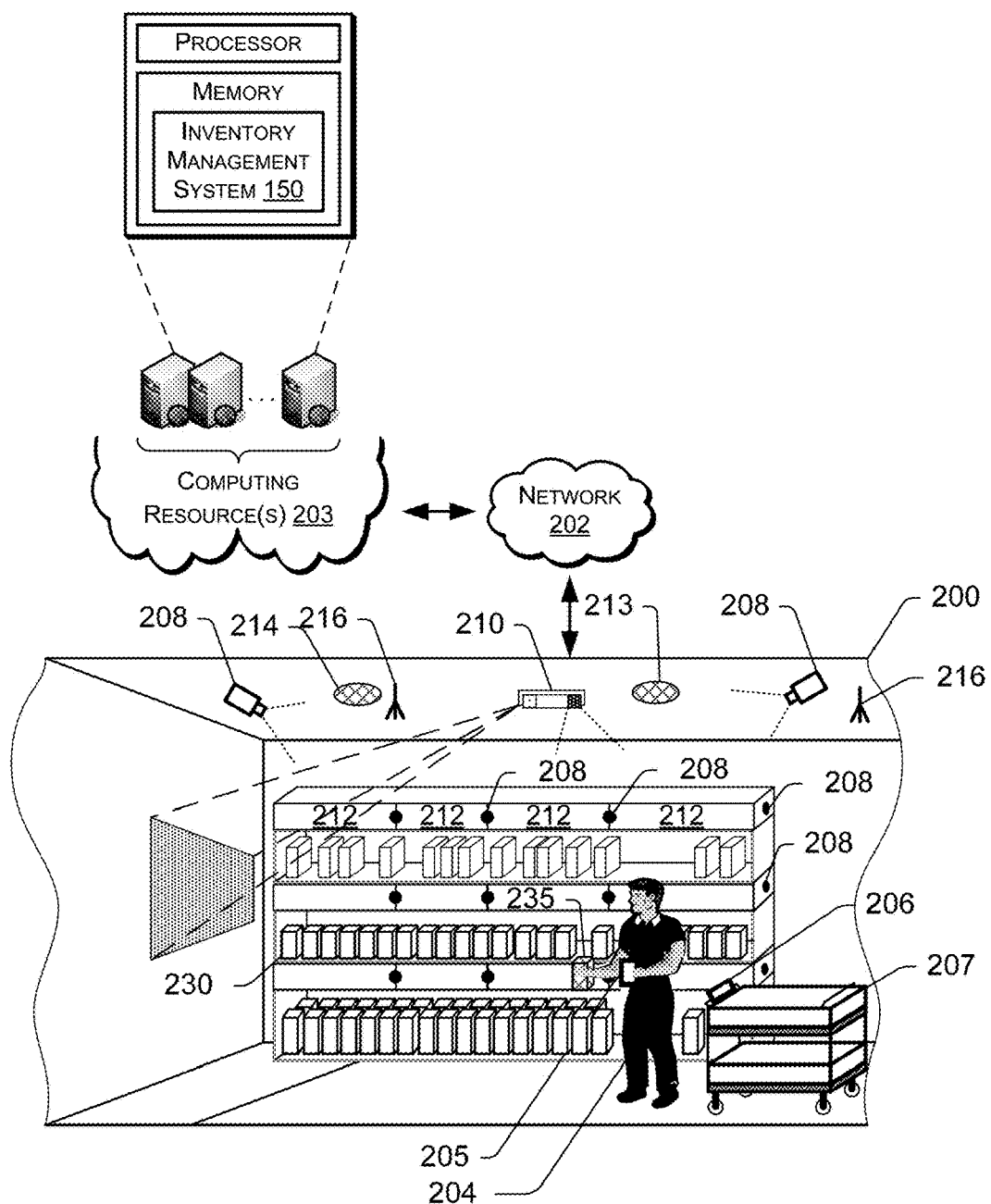
FIG. 2 shows additional components of the materials handling facility of FIG. 1, according to an implementation.

FIG. 2 shows additional components of a materials handling facility 200, according to one implementation. Generally, the materials handling facility 200 may include one or more image capture devices, such as cameras 208. For example, one or more cameras 208 may be positioned in locations of the materials handling facility 200 so that images of locations, items, and/or users within the materials handling facility can be captured. In some implementations, the image capture devices 208 may be positioned overhead, such as on the ceiling, to capture images of users and/or locations within the materials handling facility. In addition, in some implementations, one or more cameras 208 may be positioned on or inside of inventory locations. For example, a series of cameras 208 may be positioned on external portions of the inventory locations and positioned toward a location where a user may stand. Images of the user may be captured and processed to determine the orientation of the user and/or the gaze direction representing the direction in which the user is looking (gazing). Likewise, one or more cameras 208 may be positioned within the inventory locations to capture images of items stored in the inventory locations and/or images of a user picking or placing an item at the inventory location.

Any type of camera and/or configuration of cameras may be used with the implementations described herein. For example, one or more of the cameras may be RGB cameras, still cameras, motion capture/video cameras, etc. In other implementations, one or more of the cameras may be depth sensing cameras.

In addition to cameras, other input devices, such as pressure sensors, infrared sensors, scales, light curtains, load cells, radio frequency identifier ("RFID") readers, etc., may be utilized with the implementations described herein. For example, a pressure sensor and/or a load cell may be used to detect when an item is added and/or removed from an inventory location. Likewise, a light curtain may be positioned to cover the front of an inventory location and detect when an object (e.g., a user's hand) passes into or out of the inventory location. The light curtain may also include a reader, such as an RFID reader or a visual tag reader, which can detect an identification tag included on an item as the item passes into or out of the inventory location. For example, if an item includes an RFID tag, an RFID reader may detect the RFID tag when the item is located on an inventory shelf of the inventory location. The RFID reader may periodically poll the RFID tag and receive a response, thereby confirming that the inventory item remains located at the inventory location. However, if a response is not received from the RFID tag, the absence of the response may determine that the inventory item has been picked from the inventory location.

An RFID tag generally refers to a device with an antenna or resonator that can produce a wireless signal when activated or powered. The wireless signal produced by the RFID tag is typically low power and intended for transmission over short distances. The RFID tag may be formed of any material and may be flexible or rigid. In some implementations, the RFID tag may include an adhesive on a portion of the exterior of an RFID tag surface to enable attachment of the tag to an item, such as an inventory item. For example, an RFID tag may be an active RFID tag in which the RFID tag includes an internal power supply (e.g., battery), a passive RFID tag in which the RFID tag does not include a power supply and is activated by power supplied by an RFID reader, a battery-assisted RFID tag in which the RFID tag includes a power supply (battery) but is activated by power supplied by an RFID reader, an active near field communication ("NFC") tag, a passive NFC tag, a Bluetooth tag, or any other type of tag that can be configured to provide an identifier over a radio frequency. Likewise, an RFID reader, as used herein, refers to any type of RFID reader that can communicate with, interrogate and/or receive information from an RFID tag.

When the user 204 arrives at the materials handling facility 200, one or more images of the user 204 may be captured and processed. For example, the images of the user 204 may be processed to identify the user 204. This may be done using a variety of techniques, such as facial recognition, pattern matching, etc. In some implementations, rather than or in addition to processing images to identify the user, other techniques may be utilized to identify the user. For example, the user may provide an identification (e.g., user name, password), the user may present an identifier (e.g., identification badge, card), an RFID tag in the possession of the user may be detected, a visual tag in the possession of the user may be detected, biometrics may be utilized to identify the user, etc.

The captured images and/or other inputs may also be used to establish a user pattern for the user 204 while located in the materials handling facility 200. The user pattern may identify an overall shape of the user 204 and/or any distinguishing features of the user 204 (e.g., color of shirt, height) that may be used to assist in the identification and/or tracking of the user 204 as they progress through the materials handling facility 200 and/or to determine the position or orientation of the user at various locations within the materials handling facility. For example, if the user is wearing a green jacket that is open in the front, the color pattern of the jacket may be used to assist in identifying the user in a captured image and to assist in determining the orientation of the user at an inventory location.

To determine the orientation of the user, captured images may be processed using a variety of image processing techniques, such as edge detection, object recognition, color detection, etc. Utilizing these techniques, an overall shape of the user may be determined and an orientation of the user determined. For example, a camera located on a front edge of a shelf within an inventory location may capture one or more images of a user standing at the inventory location. The images may be processed to identify particular points within the determined shape of the user to determine the orientation of the user. For example, the images may be processed to determine the user's body core (chest, waist), arms and/or head positions. Based on the positions of the body parts, it can be determined whether the user is oriented toward the inventory location. Likewise, in some implementations, facial features may be captured and processed to provide gaze tracking and/or head tracking. For example, a user may move their eyes between different points or items within an inventory location 230. Cameras located at the inventory location may capture the images of the user that include the user's eyes. Those images may be processed using at least one image or video analysis algorithm and determine movement of the user's eyes (gaze tracking) between images. In addition, a ray casting algorithm may be used to virtually cast a ray in the direction of the user's determined gaze and identify the corresponding item at the inventory location at which the user is gazing.

In some implementations, a user 204 located in the materials handling facility 200 may possess a portable device 205 and obtain information about items located within the materials handling facility 200, receive confirmation that the inventory management system 150 has correctly identified items that are picked and/or placed by the user, etc. Generally, the portable device 205 has at least a wireless module to facilitate communication with the inventory management system 150 and a display (e.g., a touch based display) to facilitate visible presentation to and interaction with the user 204. The portable device 205 may store a unique identifier and provide that unique identifier to the inventory management system 150 and be used to identify the user 204. In some instances, the portable device 205 may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device 205 may operate in conjunction with or may otherwise utilize or communicate with one or more components of the inventory management system 150. Likewise, components of the inventory management system 150 may interact and communicate with the portable device 205 as well as identify the user 204, communicate with the user 204 via other means and/or communicate with other components of the inventory management system 150.

A tote 207 may also be associated with the user. The tote may be any form of apparatus configured to hold and/or carry items. For example, the tote 207 may be a bag, cart, trolley, etc. In some implementations, the tote 207 may include a device or display 206, which may be configured in a manner similar to the portable device 205. For example, the display 206 may include a touch-based display, a memory, processor, speakers, wireless network connectivity, etc. In other implementations, the tote 207 may include one or more embedded output devices. For example, the tote 207 may include illumination elements, speakers, actuators, etc., incorporated into the tote that may be activated using the implementations discussed herein.

Information, such as an item pick or item place, and/or user interfaces may be presented to the user via the portable device 205, the display 206 and/or any other output device located within the materials handling facility 200. Likewise, the portable device 205, the display 206 and/or any other input device located within the materials handling facility may be used to receive input from the user.

Generally, the inventory management system 150 may include one or more input/output devices, such as imaging devices (e.g., cameras) 208, projectors 210, displays 212, speakers 213, microphones 214, illumination elements (e.g., lights), etc., to facilitate communication between the inventory management system 150 and/or the user 204. In some implementations, multiple input/output devices may be distributed within the materials handling facility 200. For example, there may be multiple imaging devices, such as cameras located on the ceilings, cameras (such as pico-cameras) located in the aisles near the inventory locations, and/or cameras located on the inventory locations.

Likewise, the inventory management system 150 may also include one or more communication devices, such as wireless antennas 216, which facilitate wireless communication (e.g., Wi-Fi, Near Field Communication (NFC), Bluetooth) between the inventory management system 150, the portable device 205 and/or components of the materials handling facility 200. The inventory management system 150 may also include one or more computing resource(s) 203, such as a server system, that may be local to the environment (e.g., materials handling facility), remote from the environment, or any combination thereof.

The inventory management system 150 may utilize antennas 216 within the materials handling facility 200 to create a network 202 (e.g., Wi-Fi) so that the portable device 205 and/or display 206 can connect to and communicate with the inventory management system 150. Likewise, in instances when one or more of the components of the inventory management system 150 are remote from the materials handling facility 200, they may communicate with other components of the inventory management system 150, the materials handling facility 200 and/or the portable device 205 via the network 202. For example, when the user picks an item 235 from an inventory location 230, the inventory management system 150 may receive information, such as a load cell change, RFID tag identifier update, an image of the user, and/or an image of the performed action (item pick from the inventory area), identifying that an item has been picked from the inventory location 230. The event aspects (user identity, action performed, item involved in the event) may then be determined and the inventory management system 150 may send a user interface and/or information to the portable device 205 for presentation to the user 204.

Figure 3:
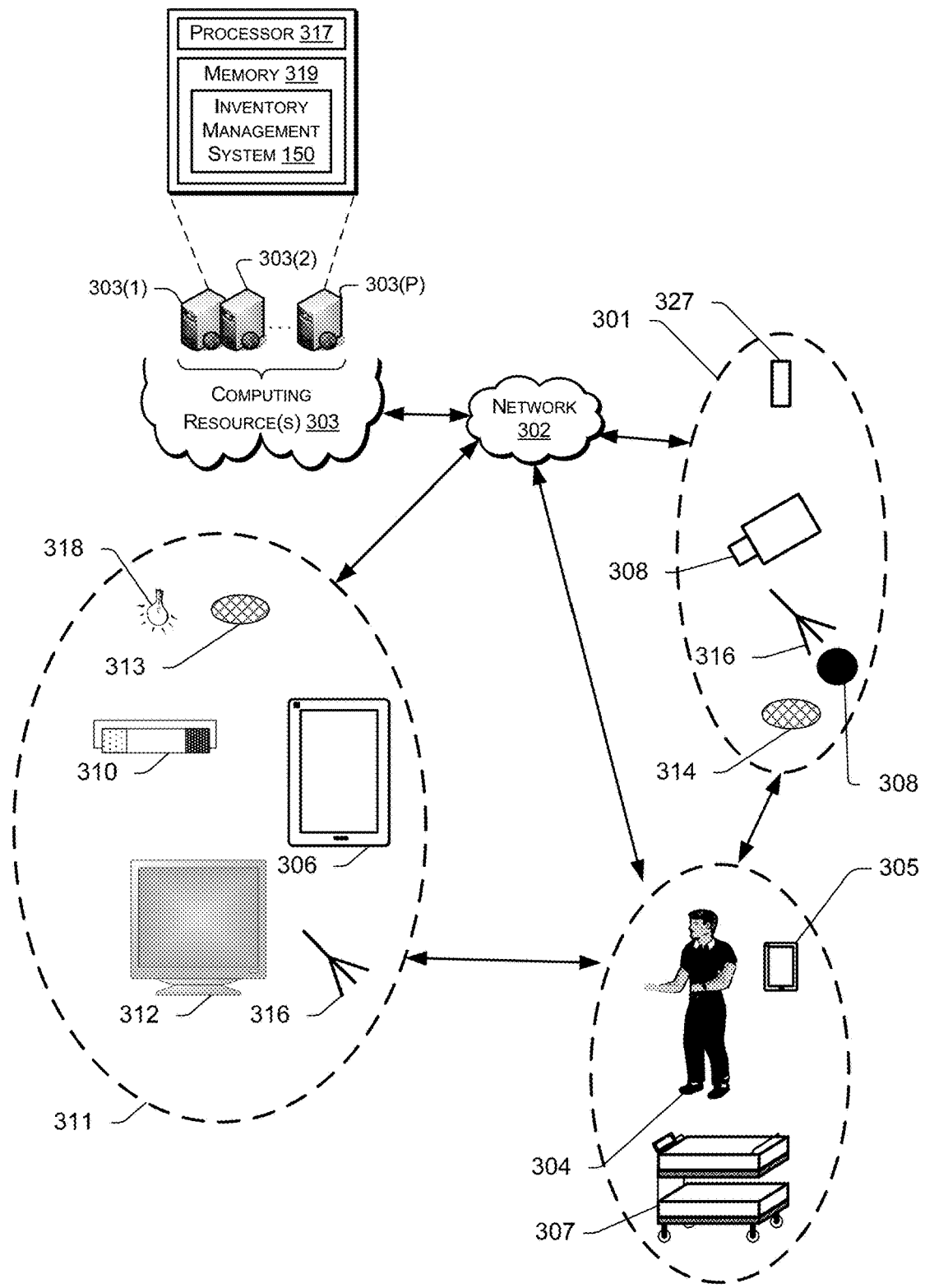
FIG. 3 shows components and communication paths between component types utilized in a materials handling facility of FIG. 1, according to an implementation.

FIG. 3 shows example components and communication paths between component types utilized in a materials handling facility 100, in accordance with one implementation. A portable device 305 may communicate and interact with various components of an inventory management system 150 over a variety of communication paths. Generally, the inventory management system 150 may include input components 301, output components 311 and computing resource(s) 303. The input components 301 may include an image capture device 308, microphone 314, antenna 316, RFID reader 327, or any other component that is capable of receiving input about the surrounding environment and/or from the user. In some implementations one or more of the input components may be utilized as a monitoring component along with the inventory management system and utilized to monitor a plurality of users in a materials handling facility and determine for each user item gaze times, item picks, item places and item in-transit times. For example, the image capture device 308 may capture images of users that are processed by the inventory management system to determine item gaze times, item picks, item places and item in-transit times for each user.

The output components 311 may include a projector 310, a portable device 306, a display 312, an antenna 316, a radio (not shown), speakers 313, illumination elements 318 (e.g., lights), and/or any other component that is capable of providing output to the surrounding environment and/or the user.

The inventory management system 150 may also include computing resource(s) 303. The computing resource(s) 303 may be local to the environment (e.g., materials handling facility), remote from the environment, or any combination thereof. Likewise, the computing resource(s) 303 may be configured to communicate over a network 302 with input components 301, output components 311 and/or directly with the portable device 305, the user 304 and/or the tote 307.

As illustrated, the computing resource(s) 303 may be remote from the environment and implemented as one or more servers 303(1), 303(2), . . . , 303(P) and may, in some instances, form a portion of a network-accessible computing platform implemented as a computing infrastructure of processors, storage, software, data access, and so forth that is maintained and accessible by components/devices of the inventory management system 150 and/or the portable device 305 via a network 302, such as an intranet (e.g., local area network), the Internet, etc. The server system 303 is to be considered part of a monitoring component and process images of users 304 to identify the user 304, determine an orientation of the user, determine a gaze direction of the user, determine item picks performed by the user, determine item places performed by the user, and/or determine item in-transit times for items picked by the user. Likewise, the images may be processed by the server system to identify items and/or item identifier tags, determine a location of items and/or determine a position of items.

The server system(s) 303 does not require end-user knowledge of the physical location and configuration of the system that delivers the services. Common expressions associated for these remote computing resource(s) 303 include "on-demand computing," "software as a service (SaaS)," "platform computing," "network-accessible platform," "cloud services," "data centers," and so forth.

Each of the servers 303(1)-(P) include a processor 317 and memory 319, which may store or otherwise have access to an inventory management system 150, which may include or provide image processing (e.g., for user identification, and/or item identification), inventory tracking, and/or location determination.

The network 302 may utilize wired technologies (e.g., wires, USB, fiber optic cable, etc.), wireless technologies (e.g., RF, IR, NFC, cellular, satellite, Bluetooth, etc.), or other connection technologies. The network 302 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 4:
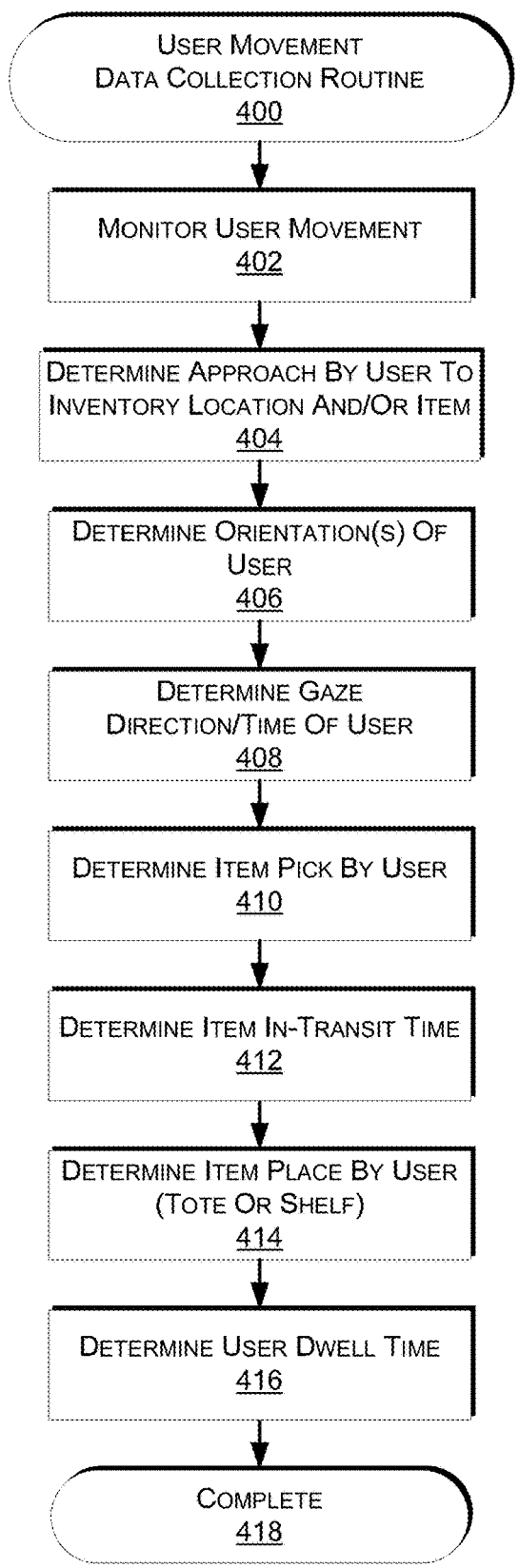
FIG. 4 is a flow diagram of a user movement data collection routine, according to an implementation.

FIG. 4 depicts a flow diagram of an example user movement data collection routine 400, according to an implementation. The routine of FIG. 4 and each of the other routines discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the routine.

The example routine 400 begins by monitoring a movement of a user through the materials handling facility, as in 402. As discussed above, when a user arrives at a materials handling facility, the user may be identified and a user pattern representative of an overall shape of the user may be established and used to monitor the location of the user as they move throughout the materials handling facility. As the user moves through the materials handling facility, different image capture devices capture images of the user that are processed to identify and continuously track the location of the user. For example, if the user pattern is of a particular size and includes a particular color palette (e.g., the colors of the user's hair, shirt, pants), captured images may be quickly processed using edge detection and color detection techniques to confirm the user pattern.

As the user progresses through the materials handling facility, a variety of additional information may be determined, as discussed in the example routine 400. For example, it may be determined that a user is approaching an inventory location and/or an item, as in 404. For example, the location of the user pattern may be continuously monitored and it may be determined that the user pattern is approaching an inventory location when the user pattern is determined to be within a defined distance (e.g., three feet) of an inventory location, and optionally the movement or cadence of the user has slowed. Additional information may also be utilized to determine if the user is approaching an inventory location. For example, images of the user may be processed to determine the orientation of the user, as in 406, and if the user is oriented toward the inventory location and within the defined distance, it may be determined that the user is approaching the inventory location.

Upon determining that the user has approached an inventory location and/or based on the orientation of the user, one or more captured images of the user (e.g., using cameras positioned at the inventory location) may be processed to determine a gaze direction of the user, as in 408. For example, images of the user may be processed to determine a position of the user's eyes and gaze tracking techniques may be utilized to determine the gaze direction of the user. In some implementations, the gaze direction may be determined to assess whether the user is looking at the inventory location. In other implementations, or in addition thereto, gaze tracking may be used to determine a particular item or group of items at which the user's gaze is directed. For example, if there are five items located on a shelf of the inventory location, gaze tracking may be performed to determine at which of the five items the user is gazing. For example, the images may be processed to determine the position of the user's eyes and the direction of the pupils of the user's eyes. Utilizing this information, a ray may be cast from a defined point (e.g., a center-point between the user's eyes) into the inventory location and the inventory item with which the ray intersects may be determined as the item at which the user is gazing.

Utilizing the gaze tracking, a gaze time may be determined which represents a time duration at which the user is gazing at the inventory location (e.g., at one or multiple items), a time duration at which the user is gazing at a particular item, a time duration at which a user is gazing back and forth (item comparison) between two or more items, etc., as in 408.

An item pick may also be determined, if the user picks an item from the inventory location, as in 410. An item pick may be determined using one or more techniques. For example, a series of images of the inventory location may be processed and compared to determine if an item has been removed from the inventory location—an item pick. Likewise, images may be processed to detect movement at the inventory location (e.g., a user's hand reaching into the inventory location) and to identify an item that is picked by the user. In still other examples, the inventory location may include one or more sensors, such as a load cell, that detects a change in a weight at the inventory location. If the weight at the inventory location decreases, it may be determined that an item has been picked from the inventory location. As still another example, an RFID reader may detect that an RFID tag associated with the item no longer responds to a request, thereby identifying that the item has been picked from the inventory location and the RFID tag of the item is out of range of the RFID reader. In still another example, images of a picked item may be captured and processed to identify a visual tag (e.g., barcode, bokode, color, shape) representative of the item to identify the picked item. Likewise, object and/or character recognition may be utilized to process the image and identify the picked item.

When an item pick is determined, an in-transit time representing a time duration between the item pick and an item place (discussed below) may be determined, as in 412. For example, if the user picks an item from the inventory location (an item pick) and looks at the item for fifteen seconds (e.g., reading item package information) and then places the item back at the inventory location (e.g., an item place), the in-transit time will be fifteen seconds plus any additional time required to move the item to and from the inventory location.

An item place of an item picked from the inventory location may also be determined, as in 414. An item place may be determined using techniques similar to those discussed above with respect to an item pick. An item place, in this example, may correspond to a placement of the item back into the inventory location or a placement of the item into a tote associated with the user. For example, if the user picks an item and places the item into a tote, an item place to tote is determined. To determine an item place to tote, one or more images may be processed to identify the placement of the item by the user into the tote. In another example, if an item pick is determined and then the user leaves or moves away from the inventory location without placing the item back at the inventory location, it may be determined that the user has placed the item into a tote associated with the user.

An overall dwell time may also be determined, as in 416. The dwell time is representative of the time between the determined user approach to the inventory location and when it is determined that the user has moved away from the inventory location. Once it is determined that the user has moved away from the inventory location, the example routine 400 completes, as in 418.

While the examples discussed above with respect to routine 400 describe monitoring a user movement through a materials handling facility, determining a user approach, orientation, gaze direction/time, item picks, in-transit times, item place and dwell time, in other implementations additional or fewer items of information may be determined. For example, the implementations discussed herein may determine which items a user picks for comparison, an order in which items are picked, combinations of items that are picked by the same user, etc. Regardless of the information determined, all or some of the determined information may be maintained in one or more data stores by the inventory management system as user movement data. Likewise, the example routine 400 may be performed with respect to multiple users that enter the materials handling facility and/or for multiple materials handling facilities. As discussed below, the collected user movement data may be utilized to determine materials handling facility patterns, inventory location trends, item trends, etc.

Figure 5:
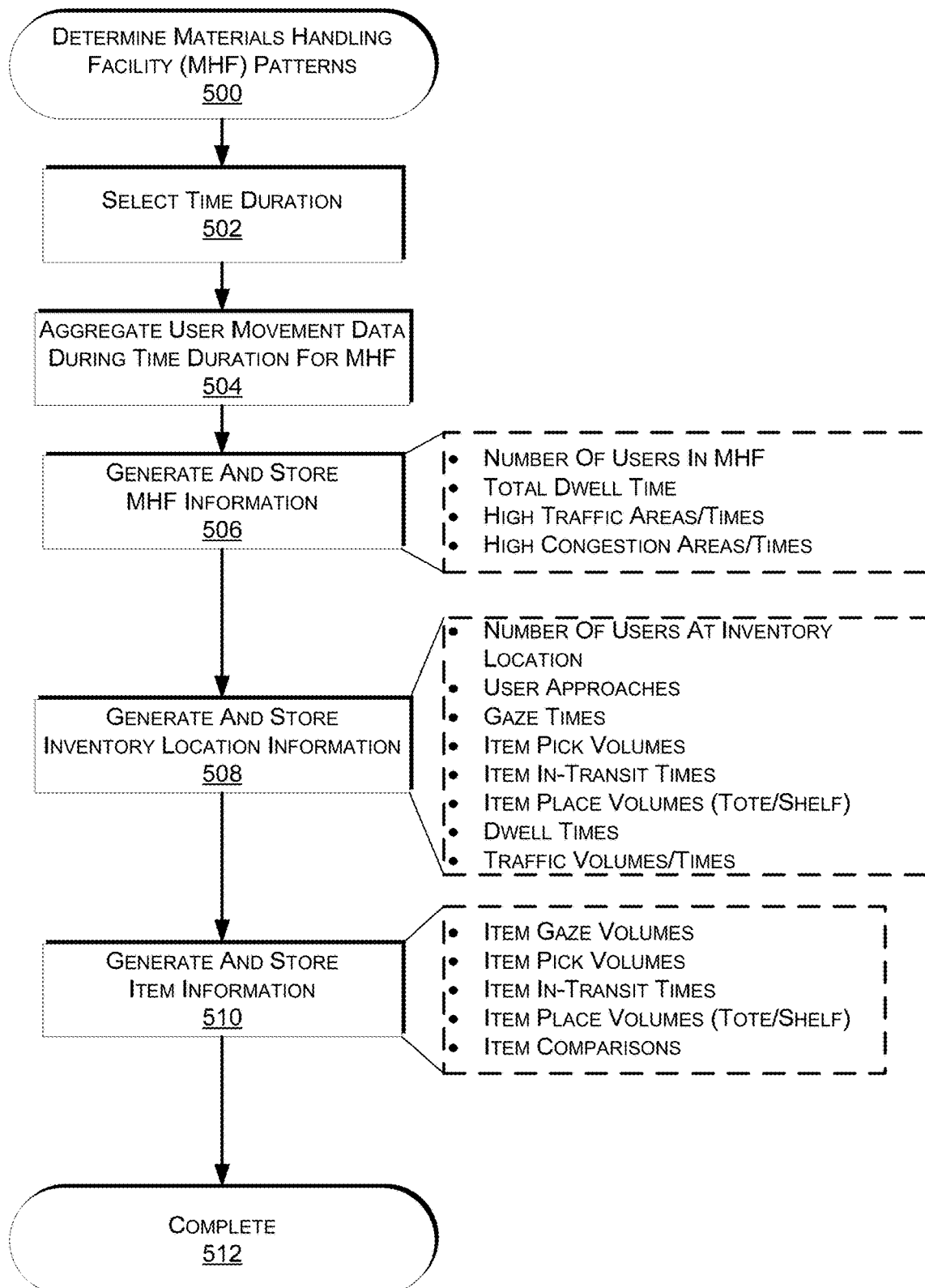
FIG. 5 is a flow diagram of a routine for determining materials handling facility patterns, according to an implementation.

For example, FIG. 5 is a flow diagram of an example routine 500 for determining materials handling facility patterns, according to an implementation. The example routine 500 begins by selecting a time duration for which materials handling facility patterns are to be determined, as in 502. The time duration may be any period of time for which user movement data has been collected. For example, the time duration may be an hourly period of time (e.g., 12:00-19:00), a day, multiple days, a week, multiple weeks, a month, multiple months, etc. Likewise, the time duration may be based on other factors. For example, the time duration may be based on the weather (e.g., time duration when it is raining outside), holidays (e.g., time duration around Christmas, New Year's), other events (e.g., time duration around the Super Bowl), and the like.

For the selected time duration, user movement data for the materials handling facility is aggregated, as in 504. For example, user movement data for all users that moved through the materials handling facility during the selected time duration may be aggregated into a data set for use by the example routine 500.

Utilizing the aggregated user movement data, materials handling facility information for the materials handling facility is generated and stored, as in 506. Materials handling facility information may be any information representative of activities occurring within the materials handling facility that can be determined, directly or indirectly, from the aggregated user movement data. For example, materials handling facility information may include, but is not limited to, the total number of users in the materials handling facility during the selected time duration, the total number of users in the materials handling facility at different times during the selected time duration, the average total dwell time of users in the materials handling facility during the selected time duration and/or during different times during the selected time duration, etc. Likewise, the aggregated user movement data may also be utilized to determine high traffic areas within the materials handling facility, times during the selected time duration when there is high traffic (a large percentage of users in the materials handling facility), high congestion areas within the materials handling facility, times during the selected time duration when there is high congestion in the areas of the materials handling facility, etc.

In addition to generating materials handling facility information relating to the entire materials handling facility, inventory location information for inventory locations within the materials handling facility may also be determined utilizing the aggregated user movement data, as in 508. Inventory location information may be any information representative of activities occurring at an inventory location within the materials handling facility that can be determined, directly or indirectly, from the aggregated user movement data.

For example, inventory location information may include, but is not limited to, the total number of users at the inventory location during the selected time duration, the total number of users at the inventory location at different times during the selected time duration, the number of users that approached the inventory location during the selected time duration and/or during specific times within the selected time duration, demographic information about users that approached the inventory location, the average total dwell time of users that approached the inventory location during the selected time duration and/or during specific times within the selected time duration, etc. Likewise, the aggregated user movement data may also be utilized to determine inventory location gaze times representing the average time that users gazed at the inventory location during the selected time duration and/or during specific times within the selected time duration, inventory location item pick volumes representing the number of items picked from the inventory location during the selected time duration and/or during specific times within the selected time duration, average inventory location item in-transit times for items picked from the inventory location during the time duration and/or during specific times within the selected time duration, inventory location item place volumes representing the number of picked items that are placed either back into the inventory location and/or placed into a tote during the selected time duration and/or during specific times within the time duration, average inventory location dwell times representing the average amount of time users remained at the inventory location during the selected time duration and/or during specific times within the time duration, inventory location traffic volumes representing the average amount of user traffic at the inventory location during the selected time duration and/or during specific times within the selected time duration, etc.

Similar to generating and storing inventory location information, item information may also be generated and stored based on the aggregated user movement data for a selected time duration, as in 510. Item information may be any information representative of activities occurring with respect to an item located within the materials handling facility that can be determined, directly or indirectly, from the aggregated user movement data.

For example, item information may include, but is not limited to, item gaze times representing the average time that users gazed at an item during the selected time duration and/or during specific times within the selected time duration, item pick volumes representing the number of times an item was picked by users during the selected time duration and/or during specific times within the selected time duration, average item in-transit times representing the average time an item is in-transit between an item pick and an item place during the selected time period and/or during specific times within the selected time duration, item place volumes representing the number of times the item is placed either back into the inventory location and/or placed into a tote during the selected time duration and/or during specific times within the time duration, item comparisons representing the number of times an item is compared with another item during the selected time duration and/or during specific times within the time duration, etc. Item comparison may be determined, for example, if the aggregated user movement data includes information illustrating that a user at an inventory location has picked two items and both have overlapping in-transits times (i.e., the user is holding both at the same time). Other techniques may also be utilized to determine item comparison. For example, images of the user may be processed to determine if the user is holding and looking at two or more items at the same time. Likewise, gaze tracking may be used to determine if a user is looking back and forth at two or more items during a defined period of time (representative of a user comparing the two items).

In addition to the information discussed above, it will be appreciated that the user movement data may be utilized to determine other information. For example, item gaze volumes, item pick volumes, item place volumes, item in-transit times, etc., may be determined for item categories, highly correlated items, items of the same or similar type at different locations in the materials handling facility, etc.

After generating and storing materials handling facility information, inventory location information and/or item information, the example routine completes, as in 512.

Figure 6:
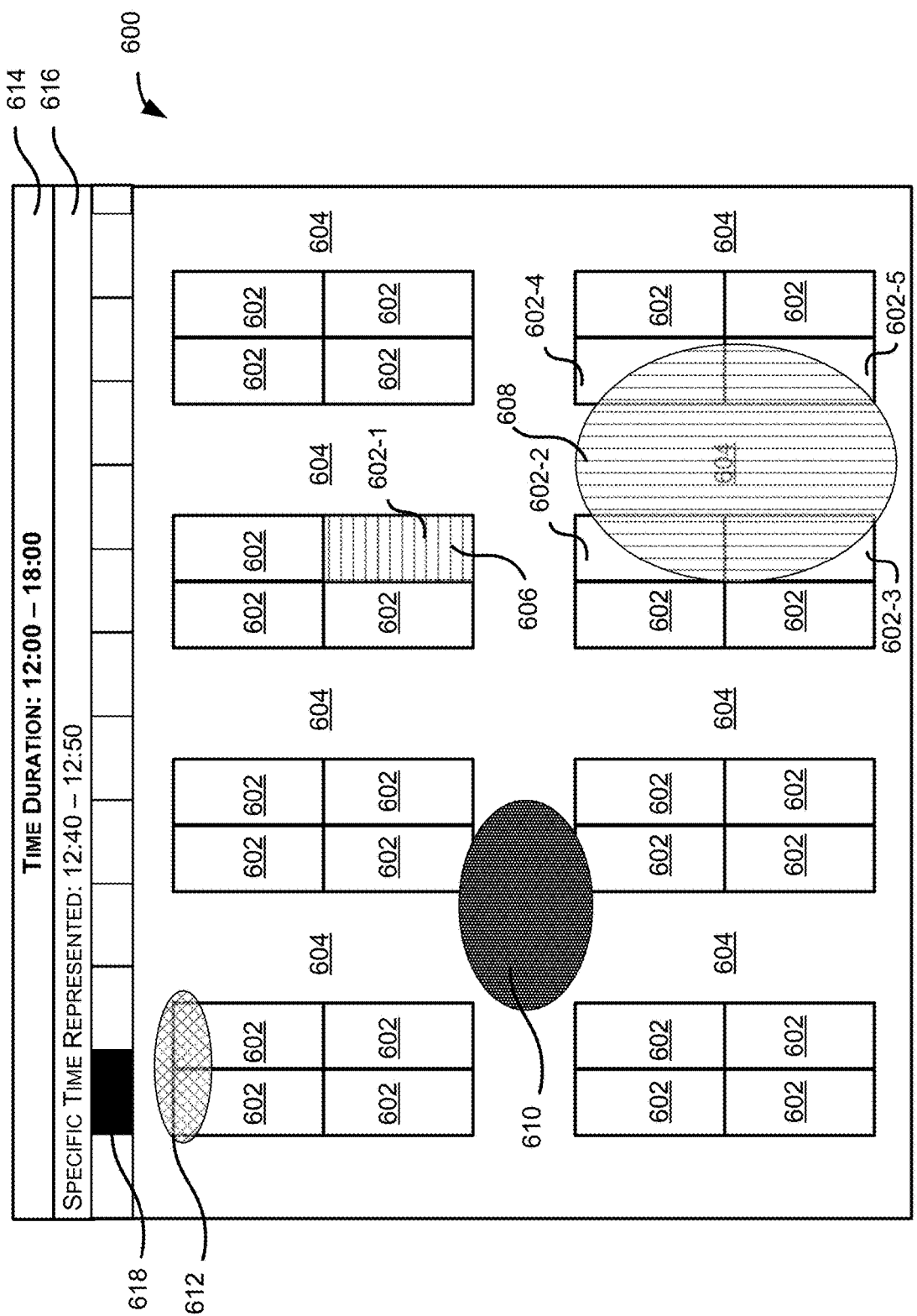
FIG. 6 is a block diagram of a materials handling facility representation with materials handling facility patterns, according to an implementation.

FIG. 6 is a block diagram illustrating a top-down view of a representation of a storage area 600 within a materials handling facility, according to an implementation. The representation of the storage area 600 includes multiple inventory locations 602 arranged in rows, thereby creating aisles 604 between the inventory locations.

The representation of the storage area 600 may be used to graphically illustrate materials handling facility information, inventory location information and/or item information determined from aggregated user movement data, as discussed above with respect to FIG. 5. For example, horizontal hatching 606 may graphically represent an inventory location 602-1 that has a low pick volume. In comparison, vertical hatching 608 may graphically represent an area of inventory locations 602-2, 602-3, 602-4, 602-5 that has a high traffic volume and/or high pick volume. Likewise, shaded area 610 may graphically represent an area of high congestion and cross-hatching 612 may represent an area with a high average dwell time.

Any materials handling facility information, inventory location and/or item information may be selected and graphically represented on the representation of the storage area 600. Likewise, the representation of the storage area 600 may provide information that covers the entire selected time duration and/or during specific times within the selected time duration. For example, graphical representation of the storage area 600 identifies the selected time duration 614, in this example 12:00-18:00. Likewise, the specific time represented 616 identifies the specific time within the selected time duration that is represented. In this example, the graphical representations 606, 608, 610, 612 correspond to the specific time of 12:40-12:50 within the selected time duration. A user may select different specific times within the selected time duration by adjusting the slider control 618. Upon selecting a different specific time within the time duration, the representations of the storage area 600 will update based on the aggregated user movement data corresponding to the specific time. The specific times may be any increment of time within the selected time duration.

The representation of the storage area 600 may be utilized to identify areas of interest within the materials handling facility, potential problem areas, such as the high congestion area 610, identify areas for item placement, etc.

Figure 7:
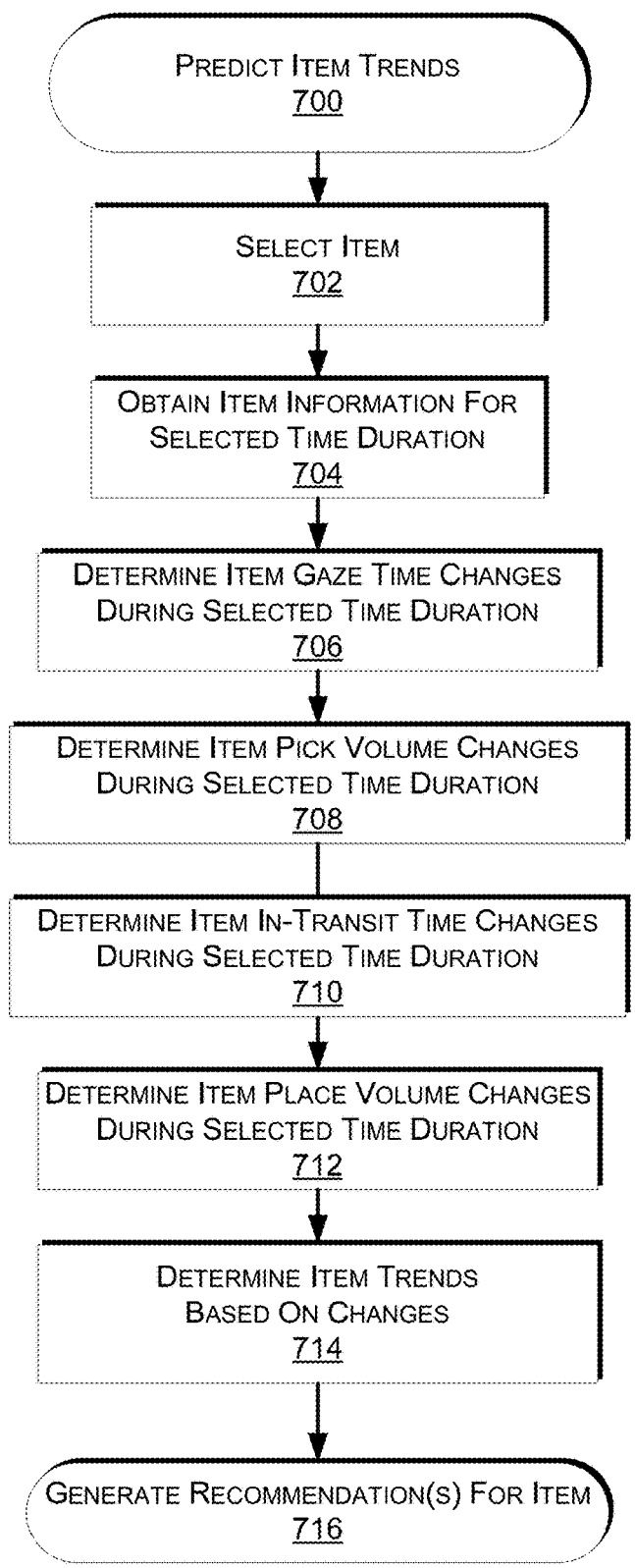
FIG. 7 is a flow diagram of a routine for predicting item trends, according to an implementation.

FIG. 7 is a flow diagram of an example routine 700 for predicting item trends, according to an implementation. Item trends may include, but are not limited to, item turnover, popularity, etc.

The example routine 700 begins by selecting an item for which an item trend is to be determined, as in 702. For example, a user may select an item from a group of items stored in a materials handling facility to obtain item trend information.

Upon selection of an item, item information for the item is obtained, as in 704. Item information may be generated as discussed above with respect to FIG. 5. In some implementations, the time duration may also be selected for which item information is to be provided. In other implementations, the time duration may correspond to the time duration specified as part of the example routine 500. In other implementations, the obtained item information may correspond to multiple time durations utilized in FIG. 5 to generate the item information. In still other implementations, the time duration may be specified as part of the example routine 700 and provided to the example routine 500 and the example routine 500 may generate item information corresponding to the specified time duration.

Utilizing the obtained item information for the selected item, item gaze time changes during the selected time duration may be determined, as in 706. For example, the item information may specify an average item gaze time among multiple users for the item at different time periods within the selected time duration. The average item gaze times may be compared to determine a change or trend in average item gaze time for the item.

In addition to item gaze time changes, item pick volume changes for the selected item may also be determined from the obtained item information, as in 708. For example, the item information may specify total item pick volumes for the item at different time periods within the selected time duration. The total item pick volumes may be compared to determine a change or trend in total item pick volumes for the item.

The example routine 700 may also determine item in-transit times for the selected item during the selected time duration, as in 710. For example, the item information may identify average item in-transit times among multiple users for the item at different time periods within the selected time duration. The average item in-transit times may be compared to determine a change or trend in the average item in-transit time for the item.

Item place volume changes for the item may also be determined from the obtained item information, as in 712. Item place volume changes may be determined for item places of the item back into the inventory location as well as item places of the item into a tote. For example, the item information may specify total item place to inventory location volumes for the item at different time periods within the selected time duration and total item place to tote volumes for the item at different time periods within the selected time duration. The total item place volumes and/or a ratio between total item place to tote and total item place to inventory location may be compared to determine a change or trend in total item place to inventory location volumes and total item place to tote volumes for the item.

Utilizing item gaze time changes, item pick volume changes, item in-transit time changes and item place volume changes, item trends for a future or second period of time may be determined for the item, as in 714.

For example, the turnover of an item, an item trend, during a second period of time may be predicted to increase if the average item gaze time trend during the specified time duration is increasing, an item place to tote volume trend is increasing during the time duration and an item place to inventory location trend is decreasing during the selected time duration. The combination of increasing gaze time trend, increasing item place to tote trend and decreasing item place to inventory location trend is often representative of very early stages of item adoption by users. In particular, users are somewhat aware of the item but are taking additional time to identify the item (representative of the increased gaze time). However, with the increasing item place to tote trend and decreasing item place to inventory location trend, when the item is picked the trend is for the user to keep the item rather than place it back into the inventory location.

In comparison, if the item gaze time trend is determined to be increasing but the item place to tote trend is decreasing and the item place to inventory location trend is increasing, this combination of information may be representative of the item losing popularity and/or the turnover of the item likely decreasing. Specifically, this combination of information illustrates that users are starting to take longer to consider the item and even when picked, it is being placed back into the inventory location more frequently. This may be representative of the item being replaced by a newer or different item.

As another example, it may be predicted that item turnover for an item will increase during a future time period if the average gaze time trend during the selected time duration is decreasing, the item pick volume trend of the item during the time duration is increasing, and the item place to tote volume trend for the item is increasing during the capture period. The combination of a decreasing gaze time trend, increasing pick volume trend and an increasing rate at which picked items are being placed into a tote, rather than returned to the inventory location, illustrate an increasing knowledge of the item (users are not taking as long to identify—gaze—at the item) and an increasing preference for the item (increasing item picks that are not returned to the inventory location). This pattern of behavior is often present as the item is nearing its peak in the product life cycle. As such, turnover can be predicted to continue increasing for a future period of time and then the item turnover rate may likely decrease as another, newer item is released to compete with the item.

As still another example, the turnover of the item may be predicted to decrease during a future time if the gaze time trend during the selected time duration is decreasing, an item place to tote volume trend is decreasing and an item place to the inventory location trend is increasing. This combination of information may be representative of the end of a products life cycle in the materials handling facility. Specifically, users are no longer gazing at the item as long and, when the item is picked, the frequency with which the item is returned to the inventory location is increasing.

While the examples above discuss gaze time, item pick, item place to tote and item place to inventory location, in other implementations, additional and/or different item information may be utilized to predict item trends. For example, item comparison information may also be considered to predict an item trend for the item. Likewise, changes in item in-transit time may be considered as a factor in predicting item trends. As still another example, item gaze time trends, item pick volume trends and/or item place volume trends may be determined for item categories and/or specified groups of items.

Utilizing the additional item information of average item gaze time, average item in-transit time and other information that was not previously available in traditional item trend prediction techniques adds another layer of granularity and predictive ability that was not previously available. Traditional systems typically rely on inventory changes over a period of time to predict item trends. This limited information often generated poor predictions that resulted in excess inventory or insufficient inventory because it was difficult to determine where the item was in the overall product life-cycle. By utilizing additional inputs in the materials handling facility to generate user movement data that can be aggregated and used to generate item information such as item gaze time, item comparison information, item in-transit time, etc., the predictive ability of future item trends is increased.

Utilizing the predicted item trends, one or more recommendations for the item may be generated, as in 716. Item recommendations may include, but are not limited to, an item placement of the item within the materials handling facility, an item price, an item quantity to maintain in an inventory of the materials handling facility, an item order quantity identifying the item to order, etc. The item placement may identify an item to keep at the inventory location, an item to remove from the inventory location, and/or another item to place at the inventory location.

Figure 8A:
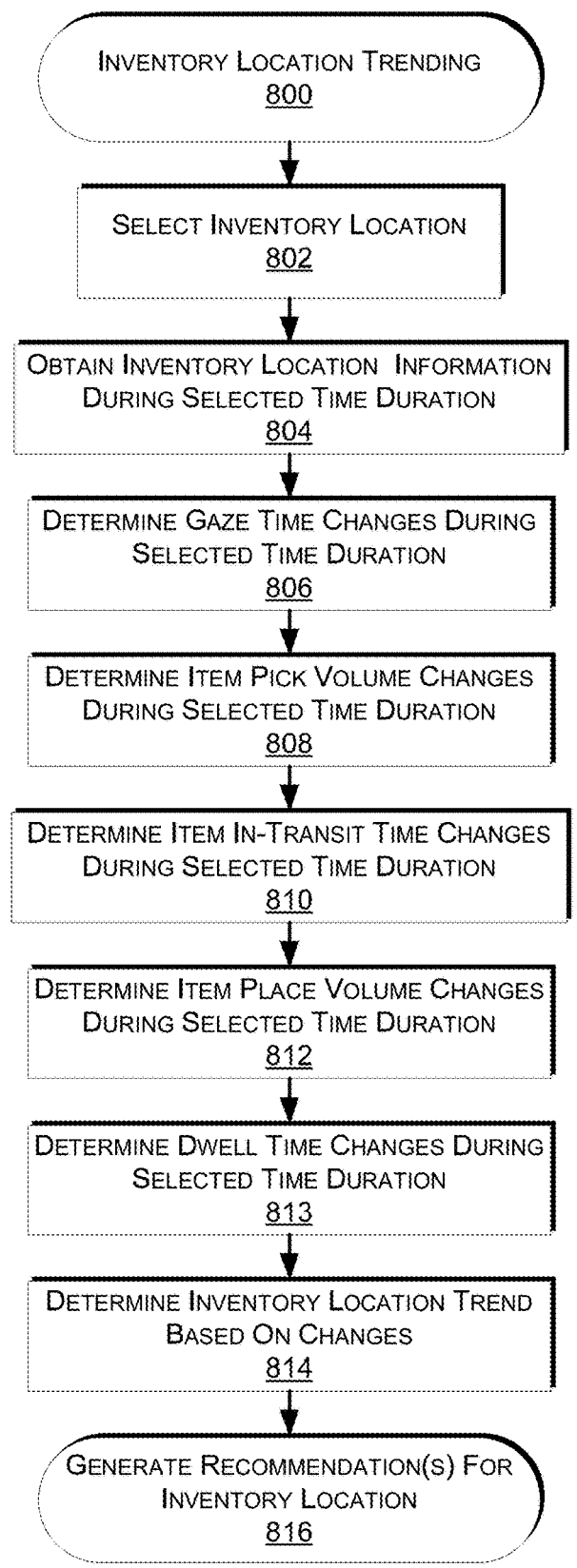
FIG. 8A is a flow diagram of a routine for predicting inventory location trends, according to an implementation.

FIG. 8A is a flow diagram of an example routine 800 for predicting inventory location trends, according to an implementation. Inventory location trends may include, but are not limited to, inventory location item turnover, popularity, user assistance needed, etc.

The example routine 800 begins by selecting an inventory location for which an inventory location trend is to be determined, as in 802. For example, a user may select an inventory location from a group of inventory locations within a materials handling facility to obtain inventory location trend information.

Upon selection of an inventory location, inventory location information for the inventory location is obtained, as in 804. Inventory location information may be generated as discussed above with respect to FIG. 5. In some implementations, the time duration may also be selected for which inventory location information is to be provided. In other implementations, the time duration may correspond to the time duration specified as part of the example routine 500. In other implementations, the obtained inventory location information may correspond to multiple time durations utilized in FIG. 5 to generate the inventory location information. In still other implementations, the time duration may be specified as part of the example routine 800 and provided to the example routine 500 and the example routine 500 may generate inventory location information corresponding to the specified time duration.

Utilizing the obtained inventory location information for the selected inventory location, inventory location gaze time changes or trends during the selected time duration may be determined, as in 806. For example, the inventory location information may specify an average inventory location gaze time among multiple users for the inventory location at different time periods within the selected time duration. The average inventory location gaze times may be compared to determine a change or trend in average inventory location gaze time for the inventory location.

In addition to inventory location gaze time changes, inventory location item pick volume changes or trend for the selected inventory location may also be determined from the obtained inventory location information, as in 808. For example, the inventory location information may specify total item pick volumes for items located at the inventory location at different time periods within the selected time duration. The total inventory location item pick volumes may be compared to determine a change or trend in total inventory location item pick volumes for the inventory location.

The example routine 800 may also determine inventory location item in-transit times for the selected item during the selected time duration, as in 810. For example, the inventory location information may identify average inventory location item in-transit times among multiple users for all items at the inventory location at different time periods within the selected time duration. The average inventory location item in-transit times may be compared to determine a change or trend in the average inventory location item in-transit time for the inventory location.

Inventory location item place volume changes for items at the inventory location may also be determined from the obtained inventory location information, as in 812. Inventory location item place volume changes or trends may be determined for all item places at the inventory location. For example, the inventory location information may specify a total item place to inventory location volumes for all items located at the inventory location.

An average dwell time trend may also be determined for the inventory location during the specified time duration, as in 813. For example, the inventory location information may include information identifying the average dwell time of users at the inventory location at different times during the selected time duration. The average dwell times for the inventory location may be compared to determine a change or trend in the average dwell time at the inventory location.

Utilizing inventory location gaze time changes, inventory location item pick volume changes, inventory location item in-transit time changes, inventory location item place volume changes, and average dwell time changes, inventory location trends for a future time may be determined for the inventory location, as in 814.

For example, the traffic volume of users at the inventory location (an inventory location trend) may be predicted to increase if the average item gaze time trend during the specified time duration is increasing, an inventory location item pick volume trend is increasing and an inventory location item in-transit time trend is increasing. The combination of increasing gaze time trend, increasing inventory location item pick volume trend and increasing inventory location item in-transit time trend illustrates that there are items of increasing interest at the inventory location and users are remaining at the inventory location longer. Other trends may also be determined from the inventory location information. For example, the inventory location information may also identify the frequency or average amount of time user assistance is provided for users located at the inventory location. This information may be utilized to determine trends in the needed amount of user assistance.

FIG. 8B is a diagram of a predictive table 850 of predicted trends 852 based on a combination of average inventory location dwell time trend 854, average inventory location gaze time trend 856 and average inventory location pick volume trend 858. The trends illustrated in FIG. 8B are representative of a predicted future popularity trend of the inventory location and, in some combinations, whether a desired item is at the inventory location. For example, it may be predicted that the popularity of the inventory location during a future time may continue to increase if it is determined that the average inventory location dwell time trend is increasing, the average inventory location gaze time trend is increasing and the average inventory location item pick volume trend is either increasing or remains unchanged. In comparison, it may be predicted that a desired item is not at the inventory location if the average inventory location dwell time trend is increasing, the average inventory location gaze time trend is increasing but the average inventory location item pick volume trend is decreasing. This combination of information may represent that users are looking for a particular item but they are not able to locate the item at the inventory location.

While the examples above discuss gaze time, item pick, and dwell time, in other implementations, additional and/or different inventory location information may be utilized to predict inventory location trends. For example, inventory location item in-transit time changes may be considered as a factor in predicting inventory location trends.

Utilizing the additional inventory location information of average inventory location gaze time, average inventory location in-transit time and other information that was not previously available in traditional prediction techniques adds another layer of granularity and predictive ability that was not previously available.

Utilizing the predicted inventory location trends, one or more recommendations for the inventory location may be generated, as in 816. Inventory location recommendations may include, but are not limited to, an item placement of at least one of a plurality of items located at the inventory location, a pricing of at least one of the plurality of items located at the inventory location, etc.

Figure 9:
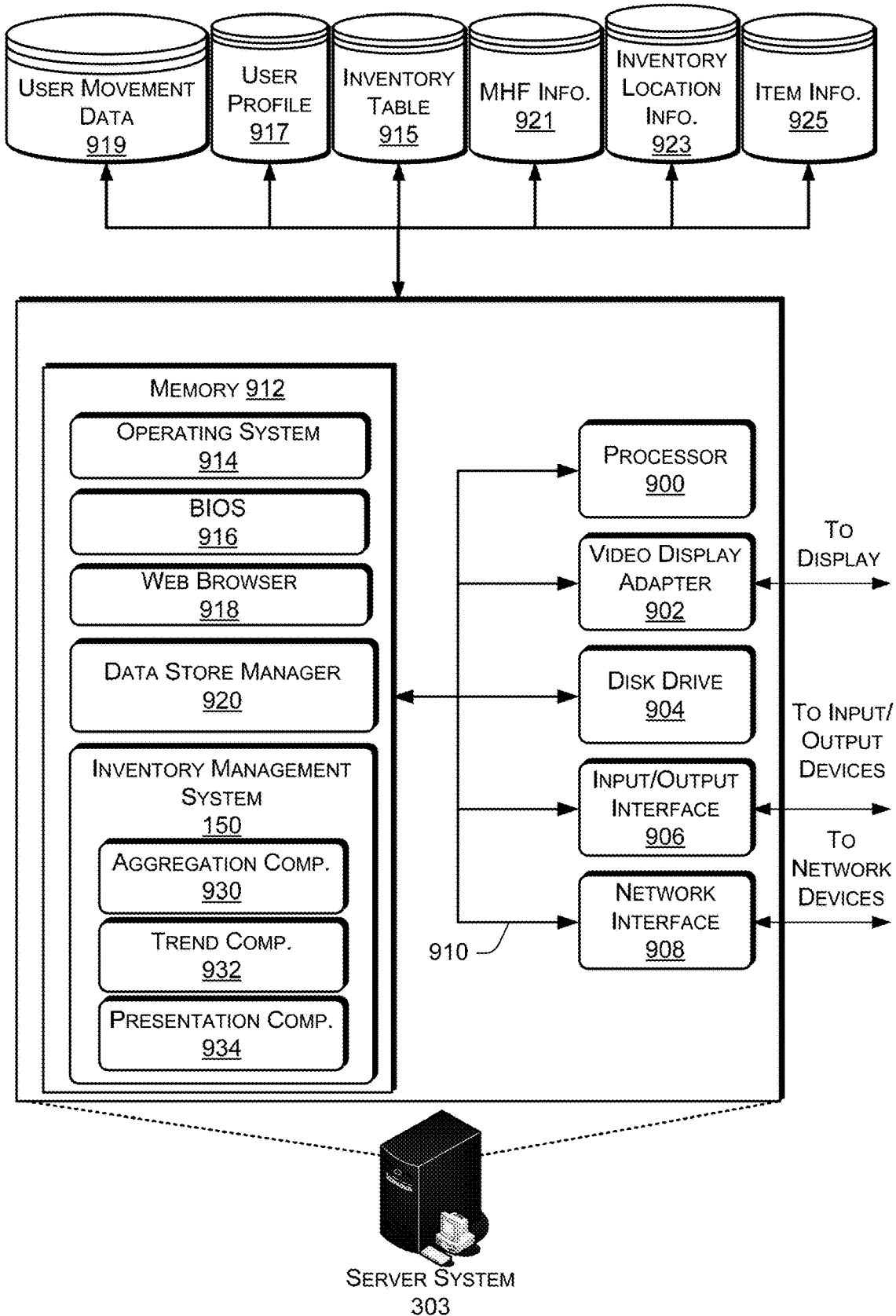
FIG. 9 is a block diagram of an illustrative implementation of a server system that may be used with various implementations.

FIG. 9 is a pictorial diagram of an illustrative implementation of a server system, such as the server system 303, that may be used in the implementations described herein. The server system 303 may include a processor 900, such as one or more redundant processors, a video display adapter 902, a disk drive 904, an input/output interface 906, a network interface 908, and a memory 912. The processor 900, the video display adapter 902, the disk drive 904, the input/output interface 906, the network interface 908, and the memory 912 may be communicatively coupled to each other by a communication bus 910.

The video display adapter 902 provides display signals to a local display (not shown in FIG. 9) permitting an operator of the server system 303 to monitor and configure operation of the server system 303. The input/output interface 906 likewise communicates with external input/output devices not shown in FIG. 9, such as a mouse, keyboard, scanner, or other input and output devices that can be operated by an operator of the server system 303. The network interface 908 includes hardware, software, or any combination thereof, to communicate with other computing devices. For example, the network interface 908 may be configured to provide communications between the server system 303 and other computing devices via the network 302, as shown in FIG. 3.

The memory 912 generally comprises random access memory (RAM), read-only memory (ROM), flash memory, and/or other volatile or permanent memory. The memory 912 is shown storing an operating system 914 for controlling the operation of the server system 303. A binary input/output system (BIOS) 916 for controlling the low-level operation of the server system 303 is also stored in the memory 912.

The memory 912 additionally stores program code and data for providing network services that allow the inventory management system 150 to identify users and/or items within the materials handling facility. In some implementations, the inventory management system may include one or more components that perform one or more aspects of the implementations discussed herein. For example, the inventory management system 150 may also include an aggregation component 930 configured to aggregate each of the item gaze times, the item picks, the item places and the item in-transit times that are determined for each of the users. Aggregation is discussed above with respect to FIG. 5. Likewise, the inventory management system 150 may include a trending component 932 configured to process the aggregated information and determine one or more materials handling facility patterns, item trends, and/or inventory location trends, as discussed above. The inventory management system may also include a presentation component 934 configured to generate a presentation of the trend information, item pick information, item place information, etc., that may be sent for display on one or more output devices.

The memory 912 may store a browser application 918. The browser application 918 comprises computer executable instructions, that, when executed by the processor 900, generate or otherwise obtain configurable markup documents such as Web pages. The browser application 918 communicates with a data store manager application 920 to facilitate data exchange between the inventory table data store 915, the user profile data store 917, the user movement data store 919, the materials handling facility information data store 921, the inventory location information data store 923, and/or the item information data store 925.

As used herein, the term "data store" refers to any device or combination of devices capable of storing, accessing and retrieving data, which may include any combination and number of data servers, databases, data storage devices and data storage media, in any standard, distributed or clustered environment. The server system 303 can include any appropriate hardware and software for integrating with the data stores 915-925 as needed to execute aspects of the inventory management system 150.

The data stores 915-925 can include several separate data tables, databases or other data storage mechanisms and media for storing data relating to a particular aspect. For example, the data stores 915-925 illustrated include mechanisms for maintaining user profile information (e.g., user pattern, user identification, purchase history, pick history), user movement data (e.g., user movement through the materials handling facility, item picks, item places), item information (e.g., item locations, images of items, item features), materials handling facility information (e.g., congestion areas, high traffic areas), inventory location information (e.g., dwell time, user approaches, item picks), and item information (e.g., item picks, item places, item in-transit times), etc., which can be used to provide confirmations to a user that the inventory management system has properly identified an item and/or the action performed by the user.

It should be understood that there can be many other aspects that may be stored in the data stores 915-925. The data stores 915-925 are operable, through logic associated therewith, to receive instructions from the server system 303 and obtain, update or otherwise process data in response thereto.

The memory 912 may also include the inventory management system 150, discussed above. The inventory management system 150 may be executable by the processor 900 to implement one or more of the functions of the server system 303. In one implementation, the inventory management system 150 may represent instructions embodied in one or more software programs stored in the memory 912. In another implementation, the inventory management system 150 can represent hardware, software instructions, or a combination thereof.

The server system 303, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction in FIG. 9 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer implemented method, comprising:
under control of one or more computing systems including one or more processors and configured with executable instructions,
collecting data with a plurality of input devices located in a materials handling facility, wherein:
at least one of the plurality of input devices is an imaging element, and
at least some of the data is a series of images captured by the imaging element;
determining for each of a plurality of users located in the materials handling facility and based at least in part on the data:
an item gaze time indicating a time duration that the user is gazing in a direction of an item, wherein the item gaze time for a first user of the plurality of users is determined at least in part by:
processing the series of images to determine a gaze direction of the first user between images of the series of images;
an item pick of the item indicating a pick of the item by the user from an inventory location;
an item place of the item indicating a place of the item by the user; and
an item in-transit time for the item indicating a time duration between the item pick and the item place;
determining, based at least in part on the item gaze time for each of the plurality of users, that an item gaze time trend for the item is decreasing;
determining, based at least in part on the item pick for each of the plurality of users, that an item pick volume trend is increasing;
determining, based at least in part on the item in-transit time for each of the plurality of users, that an item in-transit time trend is increasing;
determining, based at least in part on the determinations that the item gaze time trend is decreasing, that the item pick volume trend is increasing, and the item in-transit time trend is increasing, that a predicted item turnover for the item is increasing; and
in response to determining the predicted item turnover for the item is increasing, sending an instruction to increase a quantity of the item maintained in an inventory at the materials handling facility.

2. The computer implemented method of claim 1, further comprising:
determining for each of the plurality of users an item place to tote indicating a place of the item by the user into a tote;

determining, based at least in part on the item place to tote for each of the plurality of users, an item place to tote trend is increasing; and wherein determining the predicted item turnover is further based at least in part on the determination that the item place to tote trend is increasing.

3. The computer implemented method of claim 2, wherein:

the item gaze time trend is determined to be decreasing based at least in part on a change in a time duration of item gaze times for each of the plurality of users during a time duration;

the item pick volume trend is determined to be increasing based at least in part on a change in an item pick volume by the plurality of users during the time duration; and the item place to tote volume trend is determined to be increasing based on a change in an item place to tote volume by the plurality of users during the time duration.

4. A method, comprising:

under control of one or more computing systems including one or more processors and configured with executable instructions, for each of a plurality of users:

determining a gaze time, wherein the gaze time is determined based at least in part by:

processing a series of images of the user positioned near an inventory location within a materials handling facility to determine a gaze direction of the user between the series of images; and determining, for the user and based at least in part on the gaze direction of the user, the gaze time of the user;

determining an item pick of an item indicating a pick of the item by the user;

determining an item place of the item indicating an item place of the item by the user; and determining an item in-transit time for the item indicating a time duration between the item pick and the item place;

determining, based at least in part on the gaze time of each of the plurality of users, a gaze time change;

determining, based at least in part on the item pick for each of the plurality of users, an item pick volume change for the item located;

determining, based at least in part on the item in-transit time for each of the plurality of users, an item in-transit time change representative of a change in an in-transit time of the item;

determining a trend based on the gaze time change, the item pick volume change, and the item in-transit time change; and sending, based at least in part on the trend, an instruction to adjust a quantity of the item maintained in an inventory at the materials handling facility.

5. The method of claim 4, wherein:

the item pick of the item is representative of instances of an item pick of an item type; and the trend includes a value indicating a predicted frequency with which items of the item type will be picked during a second time duration.

6. The method of claim 4, further comprising:

determining, based at least in part on the trend, a recommendation for the item, wherein the recommendation describes at least one of a recommended item placement for the item in a materials handling facility, or a recommended item price for the item.

7. The method of claim 4, wherein the gaze time change is determined based at least in part on a difference between:

a first average gaze time for a first plurality of users during a first portion of the time duration; and a second average gaze time for a second plurality of users during a second portion of the time duration.

8. The method of claim 4, further comprising:

determining a second item pick volume change for a second item located at the inventory location based at least in part on a comparison of a first pick volume for the second item during a first portion of the time duration and a second pick volume for the second item during a second portion of the time duration; and wherein determining the trend is further based at least in part on the item pick volume change and the second item pick volume change.

9. The method of claim 4, further comprising:

determining a dwell time change based at least in part on a change in a first dwell time at the inventory location during a first portion of the time duration and a second dwell time change during a second portion of the time duration.

10. The method of claim 9, further comprising:

determining a recommendation for the inventory location, wherein the recommendation relates to at least one of a recommended item placement of at least one of a plurality of items located at the inventory location, or a recommended pricing for at least one of the plurality of items located at the inventory location.

11. The method of claim 10, wherein the item placement identifies at least one of:

an item of the plurality of items to keep placed at the inventory location, an item of the plurality of items to remove from the inventory location, or a second item to place at the inventory location.

12. A computer-implemented method, comprising:

under control of one or more computing systems including one or more processors and configured with executable instructions, determining, during a time duration and for each of a plurality of users located in a materials handling facility, user data, the user data indicating at least:

a gaze time indicating a time duration that the user is gazing in a direction, wherein the gaze time for a first user of the plurality of users is determined at least in part by:

processing a plurality of images to determine a gaze direction of the first user between images of the plurality of images;

an item pick of an item indicating a pick of the item by the user from an inventory location;

an item place of the item indicating a place of the item by the user; and an item in-transit time for the item indicating a time duration between the item pick and the item place;

determining from the user data:

inventory location information for a plurality of inventory locations within the materials handling facility, the inventory location information including, for each of the plurality of inventory locations:

an inventory location gaze time trend representing a change in an average time a gaze direction of each user of the plurality of users is oriented toward the inventory location during the time duration;

an inventory location item pick volume trend representing a change in an item pick volume during the time duration for items associated with the inventory location;

an inventory location item place volume trend representing a change in an item place volume during the time duration for the items associated with the inventory location; and an inventory location item in-transit time trend representing a change in an average time between an item pick and an item place of an item at the inventory location;

determining, based at least in part on the inventory location gaze time trend, the inventory location item pick volume trend, the inventory location item place volume trend, and the inventory location item in-transit time trend, a predicted item turnover for at least one item type corresponding to the inventory location; and in response to determining the predicted item turnover, sending an instruction to adjust a quantity of the item of the item type maintained in an inventory at the materials handling facility.

13. The computer-implemented method of claim 12, further comprising:
   determining materials handling facility information, including:
   a number of users located in the materials handling facility during the time duration;
   a high traffic area within the materials handling facility; and
   a high congestion area within the materials handling facility.

14. The computer-implemented method of claim 13, further comprising:
   generating a representation of the materials handling facility that includes:
   a first identifier identifying a location of the high traffic area within the materials handling facility; and
   a second identifier identifying a location of the high congestion area within the materials handling facility.

15. The computer-implemented method of claim 12, further comprising:
   generating a representation of the materials handling facility that includes for at least one of the plurality of inventory locations:
   a first identifier identifying a location of the at least one inventory location within the materials handling facility; and
   a second identifier representative of at least one of the inventory location gaze time trend, the inventory location item pick volume trend, the inventory location item place volume trend, or the inventory location item in-transit time trend.

16. The computer-implemented method of claim 14, wherein determining from the user data further includes determining item information, including:
   an average item gaze time representing an average time the gaze direction of each user is oriented toward an item during the time duration; and
   an average item in-transit time representing an average time between an item pick and an item place during the time duration.

17. The computer-implemented method of claim 16, wherein the item place is at least one of an item place of the item into a tote or an item place of the item into the at least one inventory location.

18. The computer-implemented method of claim 12, wherein the user data is collected from at least one of a camera, a motion sensor, an RFID reader, or a weight sensor.

19. A method, comprising:
   under control of one or more computing systems including one or more processors and configured with executable instructions,
   for each of a plurality of users:
   processing a plurality of images of an inventory location to determine an item gaze time of the user, wherein:
   the item gaze time indicates a time duration that the user is gazing in a direction of the inventory location; and
   the item gaze time is based at least in part on a gaze direction determined between two or more of the plurality of images;
   determining an item pick of an item indicating a pick of the item by the user;
   determining an item place of the item indicating an item place of the item by the user; and
   determining an item in-transit time for the item indicating a time duration between the item pick and the item place;
   determining, based at least in part on the item gaze time for each of the plurality of users, a gaze time change in a direction of the inventory location;
   determining, based at least in part on the item pick for each of the plurality of users, an item pick volume change for an item located at the inventory location;
   determining, based at least in part on the item in-transit time for each of the plurality of users, an item in-transit time change representative of a change in an in-transit time of the item, wherein the in-transit time is indicative of a time duration between an item pick of the item and an item place of the item; and
   determining a trend based on the gaze time change, the item pick volume change, and the item in-transit time change.

20. The method of claim 19, further comprising:
   sending, based at least in part on the trend, an instruction to adjust a quantity of the item maintained in an inventory at a materials handling facility.

21. The method of claim 19, wherein the trend includes a value indicating a predicted frequency with which items of an item type of the item will be picked during a second time duration.

22. The method of claim 19, further comprising:
   determining, based at least in part on the trend, a recommendation for the item, wherein the recommendation describes at least one of a recommended item placement for the item in a materials handling facility, or a recommended item price for the item.

23. The method of claim 19, further comprising:
   determining a second item pick volume change for a second item located at the inventory location based at least in part on a comparison of a first pick volume for the second item during a first portion of the time duration and a second pick volume for the second item during a second portion of the time duration; and
   wherein determining the trend is further based at least in part on the item pick volume change and the second item pick volume change.

24. The method of claim 19, further comprising:
   determining, based at least in part on the inventory location, a recommendation for the inventory location, wherein the recommendation relates to at least one of a recommended item placement of at least one of a plurality of items located at the inventory location, or a recommended pricing for at least one of the plurality of items located at the inventory location.

* * * * *